United States Patent
Gaugler et al.

(10) Patent No.: US 10,411,289 B2
(45) Date of Patent: Sep. 10, 2019

(54) LITHIUM BATTERY

(71) Applicant: VARTA Microbattery GmbH, Ellwangen (DE)

(72) Inventors: Winfried Gaugler, Ellwangen (DE); Hanna Siwek, Ellwangen (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 87 days.

(21) Appl. No.: 15/584,359

(22) Filed: May 2, 2017

(65) Prior Publication Data

US 2017/0324112 A1 Nov. 9, 2017

(30) Foreign Application Priority Data

May 3, 2016 (EP) ..................................... 16168049

(51) Int. Cl.
*H01M 10/0525* (2010.01)
*H01M 10/0585* (2010.01)
(Continued)

(52) U.S. Cl.
CPC ....... *H01M 10/0525* (2013.01); *H01M 2/022* (2013.01); *H01M 2/027* (2013.01);
(Continued)

(58) Field of Classification Search
CPC ......... H01M 10/0525; H01M 10/0585; H01M 2/022; H01M 2/0232; H01M 2/027;
(Continued)

(56) References Cited

U.S. PATENT DOCUMENTS 3,945,846 A * 3/1976 Dey ..................... H01M 2/0235
429/166
4,049,980 A * 9/1977 Maitland ................. G05F 3/205
327/541
(Continued)

FOREIGN PATENT DOCUMENTS

DE 32 40 806 A1 5/1984
DE 3240806 * 5/1984
DE 34 09 584 A1 9/1984

OTHER PUBLICATIONS

European Search Report dated Nov. 15, 2016 in corresponding European Patent Application No. 16168049.1.

*Primary Examiner* — Jayne L Mershon
(74) *Attorney, Agent, or Firm* — DLA Piper LLP (US)

(57) ABSTRACT

A lithium battery includes a positive electrode designed as a hollow cylinder and defines a cavity, a negative electrode arranged in the cavity, a separator, a liquid electrolyte, a first current collector for the negative electrode, a second current collector for the positive electrode, an at least two-part housing that encloses an interior space in which the positive electrode together with the negative electrode arranged in the cavity and the separator are arranged, wherein a pin is provided as a first current collector inside the housing, a part of the housing serves as a second current collector, the pin has a first, terminal section embedded in the negative electrode and in direct contact with the negative electrode, and the pin has a second section not in direct contact with the negative electrode, and an insulator element that protects the second section at least partially against direct contact with the electrolyte.

20 Claims, 1 Drawing Sheet

(51) Int. Cl.
*H01M 2/02* (2006.01)
*H01M 2/06* (2006.01)
*H01M 4/134* (2010.01)
*H01M 4/38* (2006.01)
*H01M 6/08* (2006.01)
*H01M 6/14* (2006.01)
*H01M 4/131* (2010.01)
*H01M 4/136* (2010.01)
*H01M 4/36* (2006.01)
*H01M 4/505* (2010.01)
*H01M 4/525* (2010.01)
*H01M 4/58* (2010.01)
*H01M 10/04* (2006.01)
*H01M 10/0562* (2010.01)

(52) U.S. Cl.
CPC ........... *H01M 2/0232* (2013.01); *H01M 2/06* (2013.01); *H01M 4/134* (2013.01); *H01M 4/382* (2013.01); *H01M 6/085* (2013.01); *H01M 6/14* (2013.01); *H01M 10/0585* (2013.01); *H01M 4/131* (2013.01); *H01M 4/136* (2013.01); *H01M 4/36* (2013.01); *H01M 4/505* (2013.01); *H01M 4/525* (2013.01); *H01M 4/58* (2013.01); *H01M 10/0422* (2013.01); *H01M 10/0562* (2013.01)

(58) Field of Classification Search
CPC ........ H01M 2/06; H01M 4/134; H01M 4/382; H01M 6/085; H01M 6/14
USPC ......................................................... 429/323
See application file for complete search history.

(56) References Cited

U.S. PATENT DOCUMENTS 4,565,002 A * 1/1986 Matsuo ................ B29O 53/382
  29/623.4
2008/0085451 A1 * 4/2008 Freitag ................ H01M 2/0232
  429/174

* cited by examiner

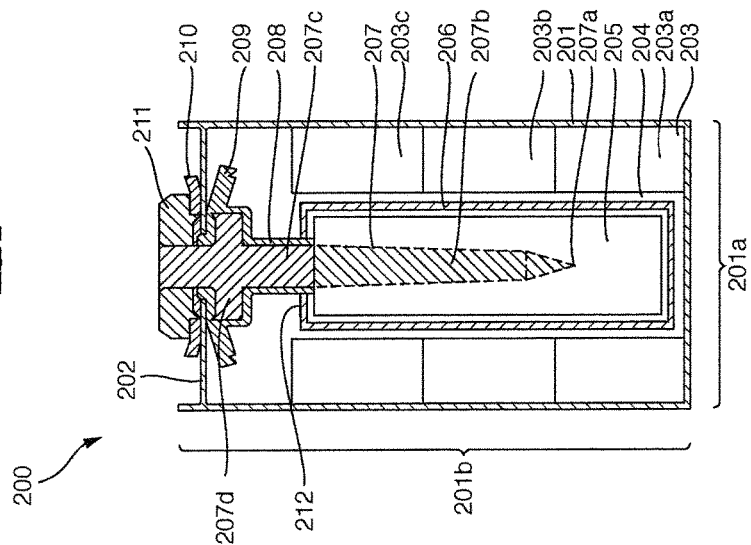
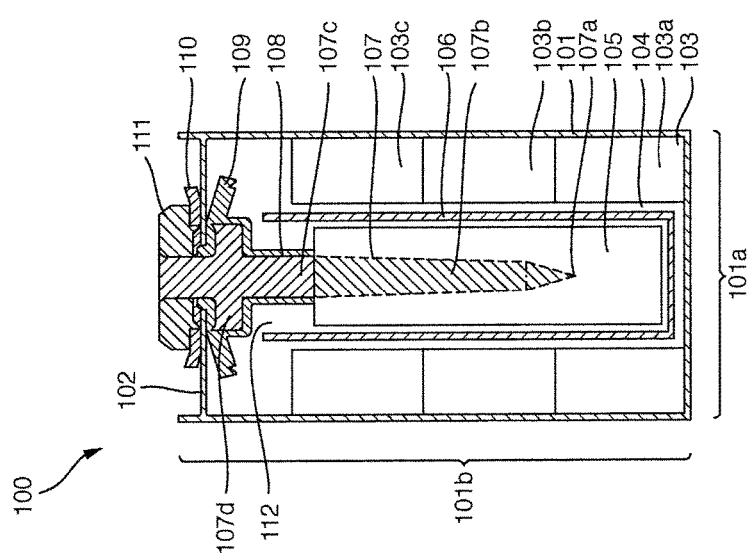

LITHIUM BATTERY

TECHNICAL FIELD

This disclosure relates to a battery having a positive electrode designed as a hollow cylinder and defines a cavity, and an electrode of opposite polarity arranged in the cavity.

BACKGROUND

The term "battery" originally means a plurality of electrochemical cells connected in series. However, nowadays individual electrochemical cells (individual cells) are very frequently also understood to be batteries.

Batteries with the design mentioned above are frequently cells in which an alkali metal, in particular lithium, is used as the active material in the negative electrode. Examples of batteries with a negative lithium electrode are a lithium thionylchloride battery, lithium sulphur dioxide battery, lithium carbon monofluoride battery, lithium iron sulphide battery and lithium manganese dioxide battery. In the last-mentioned lithium manganese dioxide battery, manganese dioxide electrodes are used as the positive electrode, in a lithium iron sulphide battery, iron disulphide electrodes are used as the positive electrode, and in a lithium sulphur dioxide battery, sulphur dioxide dissolved in acetonitrile (absorbed in an inert electrode) is used as the positive electrode. In that context, the positive electrodes are often designed as hollow cylinders. The negative lithium electrode is arranged in the interior of the positive electrode, surrounded by a separator that separates the positive electrode from the negative electrode, but at the same time permits the transfer of ions between the two electrodes. The transfer of ions is generally ensured by the use of a suitable electrolyte. For batteries with lithium electrodes, in particular electrolytes in which a salt such as, for example, lithium hexafluorophosphate is dissolved in an organic solvent, for example, in a carbonate, are particularly suitable.

The electrical contact with the positive electrode generally doesn't constitute a problem. Its outside is usually in direct contact with the inner wall of an electrically conductive battery housing part. The electrical contact can be made correspondingly via this housing part. In contrast, formation of contact with the negative electrode is more complex. A pin which is tapered to a point in a conical fashion at one end and has at the other end a flange which plays a role in the sealing of the housing is conventionally used for this. A typical example of such a current collector can be found in DE 32 40 806 A1.

A problem that occurs repeatedly with the described batteries is the occurrence of internal short-circuits. Lithium ions dissolved in the electrolyte can become deposited to form dendrites on the negative current collector. Such formation of dendrites is a problem, in particular, when temperature differences occur inside a battery, for example, as a result of local heating by an external heat source or as result of local cooling if part of the battery is in direct contact with a good conductor of heat. The dendrites grow over time and starting from a certain size they can enter into direct contact with the positive electrode, which causes the abovementioned short-circuits.

A known solution to that problem is to install the negative electrode in the form of a hollow cylinder. Deposition of lithium then occurs in particular in the interior of the hollow cylinder. As a result, short-circuit problems are effectively counteracted, but the basic problem of the deposition of lithium from the electrolyte on negative current collectors is not solved. In addition, the described measure has a negative effect on the energy density of batteries in question.

SUMMARY

We provide a lithium battery including a) a positive electrode designed as a hollow cylinder and defines a cavity, b) a negative electrode arranged in the cavity, c) a separator arranged between the positive and the negative electrode, d) a liquid electrolyte with which the electrodes and the separator are soaked, e) a first current collector for the negative electrode, f) a second current collector for the positive electrode, g) an at least two-part housing that encloses an interior space in which the positive electrode together with the negative electrode arranged in the cavity and the separator are arranged, wherein a pin is provided as a first current collector inside the housing, a part of the housing serves as a second current collector, the pin has a first, terminal section completely embedded in the negative electrode and thus in direct contact with the negative electrode, and the pin has a second section not in direct contact with the negative electrode, and an insulator element that protects the second section at least partially against direct contact with the electrolyte.

BRIEF DESCRIPTION OF THE DRAWINGS

Illustrated in FIGS. 1 and 2 are schematic longitudinal sectional views that explain two preferred examples of our batteries.

DETAILED DESCRIPTION

We provide a battery that is a lithium battery that has a positive electrode designed as a hollow cylinder and defines a cavity, as well as a negative electrode arranged in the cavity. A separator is arranged between the positive and the negative electrode. The positive electrode together with the negative electrode arranged in the cavity and the separator are enclosed by a generally at least two-part housing. The latter has an interior space in which the electrodes and the separator are arranged.

To make electrical contact with the electrodes, a first current collector is provided for the negative electrode and a second current collector is provided for the positive electrode. A part of the housing that encloses the positive electrode serves as a second current collector for the electrode. A pin is provided as a first current collector for the negative electrode. The pin has a first, terminal section completely embedded in the negative electrode and thus in direct contact with the negative electrode, and a second section which is not in direct contact with the negative electrode.

The pin is preferably composed of a conductive metal or metal alloy, preferably of steel, in particular a stainless steel. In some examples, it can also have a coating of nickel or of a nickel alloy, preferably a continuous coating of nickel or of a nickel alloy.

Preferably, the pin has two ends, one of which is shaped as a conically extending tip, and the other one comprises a flange or is shaped as a flange. The pin preferably has the conically extending tip at the free end of the first section. The second section is preferably located between the flange and the first section.

The pin can have a thread on its outside, in particular in the region of the first section.

If the pin has a thread, it is preferred that the pin has, instead of the flange, a head and a stem protruding out of the head, wherein the stem comprises a region that has the thread. The head preferably has an upper side and a lower side. In one example, it is preferred that the stem protrudes out of the head on the lower side, wherein the upper side is of flat design.

The region having the thread is, in the sense of the above definition, preferably the first, terminal section of the pin. It is particularly preferred therefore that the region of the stem having the thread is completely embedded in the negative electrode and thus is in direct contact with the negative electrode. The second section of the pin is then preferably the section of the stem between the head and the first section.

The battery is particularly distinguished by the fact that it has an insulator element that protects the second section at least partially against direct contact with the electrolyte. Even more preferred, the insulator element protects the complete second section against direct contact with the electrolyte.

Preferably, the insulator element is in direct contact with the second section. Particularly preferably, the insulator element coats or covers the surface of the pin in the second section, thereby protecting the second section against direct contact with the electrolyte.

The insulator element is preferably composed of an electrically non-conductive material, in particular of an electrically non-conductive plastic impenetrable to the electrolyte contained in the battery. The insulator element is preferably composed of a non-porous plastic. Suitable plastics are, for example, polypropylene (PP), polyphenylene-sulphide (PPS) and polyether ether ketone (PEEK). If appropriate, multi-layer films can also be used, for example, films made of two layers of PP and one layer of polyamide (PA) arranged between them.

The insulator element is particularly preferably a sleeve that can be fabricated by injection moulding or deep drawing, for example, from a film composed of one of the abovementioned plastic materials.

Alternatively, the insulator element can also be an electrically non-conductive coating, in particular an electrically non-conductive surface coating agent.

Ideally, the insulator element bears snugly against the surface of the pin in the second section. For this purpose, the size and shape of the insulator element are preferably matched precisely to the shape and dimension of the pin which is used.

Particularly preferably, the separator is designed as a closed container that completely encloses the negative electrode and merely has a breakthrough for the first current collector. The separator can be permanently connected to the insulator element, for example, by welding or bonding, in particular by adhesive bonding.

The separator is a porous sleeve made of a plastic, for example, made of polypropylene. The separator is particularly preferably composed of one or more non-woven fabric parts.

The housing of a battery is generally composed of a plurality of individual parts. Usually, it comprises:
- a first beaker-shaped housing part with an end-side housing base, a circumferential housing casing and an end-side opening that lies opposite the housing base, and
- a second housing part that closes off the end-side opening of the first housing part.

As a rule, the housing parts are composed of metal, for example, sheet steel.

Preferably, the second housing part is designed in a disc shape and the first current collector electrically connects to the second housing part, in particular by welding. It is then usually preferred that the second housing part serves as a negative tapping pole of the battery. An electrically insulating seal is then required which is arranged between the first and second housing parts.

Further preferably, the second housing part is designed in a disc shape and has a breakthrough through which the first current collector is led out of the interior of the housing towards the outside. In this case, it is particularly preferred that the housing has an electrically insulating seal that prevents contact between the first current collector and the second housing part. The part of the current collector led towards the outside can then itself serve as a negative tapping pole of the battery.

It is preferred that the positive electrode designed in a hollow cylindrical fashion is in direct contact with the first housing part, in particular bears directly on it over a large area. The first, beaker-shaped housing part preferably serves as a positive tapping pole of the battery.

In particular, for reasons of production technology, the positive electrode designed as a hollow cylinder is generally not introduced into the beaker-shaped housing part in one piece, but rather in the form of individual segments that form the positive electrode when combined. It is correspondingly preferred that the positive electrode is composed of at least two annular individual segments that adjoin one another in a planar fashion via first contact faces and bear on the first housing part via second contact faces. For example, two or more annular segments can be stacked one on top of the other in the beaker-shaped cell housing. In this case, the internal diameter of the annular segments determines the volume and the diameter of the cavity for the negative electrode. The external diameter of the annular segments is generally matched precisely to the corresponding internal diameter of the beaker-shaped first housing part.

The described features, and further features, of our batteries can be found in the following description of preferred examples illustrated in the drawings. In this context, individual features can be implemented independently or in combination. The described examples serve merely for the purpose of explanation and provide better understanding and are not to be understood as restrictive in any way.

The battery 100 illustrated in FIG. 1 has a housing composed of a beaker-shaped housing part 101 and a disc-shaped housing part 102. The housing part 101 comprises a planar base 101a designed in a circular shape and a cylindrical casing 101b. At the end side, the housing part 101 has a circular opening that lies opposite the base 101a. The opening is closed off by the disc-shaped housing part 102.

Arranged in the interior of the housing is the positive electrode 103 designed as a hollow cylinder and composed of three individual segments 103a to 103c. The positive electrode 103 is composed essentially of manganese dioxide. The individual segments 103a to 103c are each designed in an annular shape and have respectively identical external and internal diameters. The segments 103a to 103c are arranged in a stack shape inside the housing part 101 and define the cavity 104 in their center. Arranged in the cavity 204 is the negative electrode 105 which is composed of metallic lithium (a cord made of lithium metal) and surrounded by a beaker-shaped separator 106. The latter separates the electrodes 103 and 105 from one another. The separator 106 is a sleeve made of a non-woven fabric composed of plastic fibers, for example, made of polypropylene. At its upper end 112 the sleeve is open.

The negative electrode 105 arranged inside the cavity 104 is contacted by the pin-shaped current collector 107. The latter has a first, terminal section 107b completely embedded in the negative electrode 105 and thus in direct contact with the negative electrode 105, and a second section 107c not directly in contact with the negative electrode 105. Furthermore, the current collector 107 has the conically extending tip 107a and the flange 107d.

The disc-shaped housing part 102 has a central breakthrough through which the current collector 107 is led out of the interior of the housing towards the outside. To prevent electrical contact between the current collector 107 and the housing part 102, the electrically insulating seals 109 and 110 are arranged between the housing part 102 and the current collector 107. The seals 109 and 110 are also shielded by the clamping element 111, generally composed of metal, from the housing part 102.

In the region of the second section 107c, electrolyte located in the interior space of the housing composed of the housing parts 101 and 102 could enter directly into contact with the current collector 107. However, this is effectively prevented by the insulator element 108. The insulator element 108 is a precisely fitting sleeve made of plastic pulled onto the current collector 107. The latter covers the current collector 107 from the seal 109 as far as the point at which it enters the negative electrode 105. Preferably, the insulator element 108 can be permanently connected to the seal 109, for example, by fusing or bonding.

The battery 200 illustrated in FIG. 2 has a housing made of a beaker-shaped housing part 201 and a disc-shaped housing part 202. The housing part 201 comprises a planar base 201a designed in a circular shape, and a cylindrical casing 201b. At the end side, the housing part 201 has a circular opening that lies opposite the base 201a. This opening is closed off by the disc-shaped housing part 202.

Arranged in the interior of the housing is the positive electrode 203 designed as a hollow cylinder and composed of three individual segments 203a to 203c. The positive electrode 203 is composed essentially of manganese dioxide. The individual segments 203a to 203c are each designed in an annular shape and have respectively identical external and internal diameters. They are arranged inside the housing part 201 in a stack shape and define the cavity 204 in their center. Arranged in the cavity 204 is the negative electrode 205 composed of metallic lithium (a cord made of lithium metal) and surrounded by a beaker-shaped separator 206. The latter separates the electrodes 203 and 205 from one another. The separator 206 is a sleeve made of a non-woven fabric composed of plastic fibers, for example, made of polypropylene.

However, in contrast to the example illustrated in FIG. 1, the sleeve is not open at its upper end 212. Instead, the separator 206 is designed here as a closed container that completely encloses the negative electrode 205 and merely has a breakthrough for the pin-shaped current collector 207. The separator 206 can be permanently connected to the insulator element 208, for example, by welding or bonding.

The current collector 207 makes contact with the negative electrode 205 arranged inside the cavity 204. The current collector 207 has a first, terminal section 207b completely embedded in the negative electrode 205 and thus in direct contact with the negative electrode 205, and a second section 207c not in direct contact with the negative electrode 205. Furthermore, the current collector 207 has the conically extending tip 207a and the flange 207d.

The disc-shaped housing part 202 has a central breakthrough through which the current collector 207 is led out of the interior of the housing towards the outside. To prevent electrical contact between the current collector 207 and the housing part 202, the electrically insulating seals 209 and 210 are arranged between the housing part 202 and the current collector 207. The seals 209 and 210 are also shielded from the housing part 202 by the clamping element 211 which is generally composed of metal.

In the region of the second section 207c, electrolyte located in the interior space of the housing composed of the housing parts 201 and 202 could enter into direct contact with the current collector 207. However, this is effectively prevented by the insulator element 208. The insulator element 208 is a precisely fitting sleeve made of plastic which is pulled onto the current collector 207. The sleeve covers the current collector 207 from the seal 209 as far as the point at which it enters into the negative electrode 205. Preferably, the insulator element 208 can be permanently connected to the seal 209, for example, by fusing or bonding.

Batteries according to the examples illustrated in FIGS. 1 and 2 have been subjected to a storage test with a temperature gradient (negative electrode warmer than the positive electrode). Under these conditions, typically lithium deposition on the current collector would occur. However, after the conclusion of the test it was not possible to observe any deposits of lithium on the current collectors 107 and 207.

The invention claimed is:
1. A lithium battery comprising:
a) a positive electrode designed as a hollow cylinder and defines a cavity;
b) a negative electrode arranged in the cavity;
c) a separator arranged between the positive and the negative electrode;
d) a liquid electrolyte with which the electrodes and the separator are soaked;
e) a first current collector for the negative electrode;
f) a second current collector for the positive electrode;
g) an at least two-part housing that encloses an interior space in which the positive electrode together with the negative electrode arranged in the cavity and the separator are arranged,
wherein
a pin is provided as a first current collector inside the housing,
a part of the housing serves as a second current collector,
the pin has a first, terminal section completely embedded in the negative electrode and thus in direct contact with the negative electrode, and
the pin has a second section immediately adjacent to the first, terminal section and that is not in direct contact with the negative electrode; and
h) an insulator element that prevents direct contact with the electrolyte with the second section.
2. The battery according to claim 1, wherein
the insulator element is composed of an electrically non-conductive plastic,
the insulator element is a film or a sleeve, and/or
the insulator element is a coating or a surface coating agent.
3. The battery according to claim 2, wherein
the separator is designed as a closed container that completely encloses the negative electrode and merely has a breakthrough for the first current collector, and/or
the separator is connected to the insulator element by welding or bonding.

4. The battery according to claim 2, wherein
the housing comprises a first, beaker-shaped housing part with an end-side housing base, a circumferential housing casing and an end-side opening which lies opposite the housing base, and/or
the housing comprises a second housing part that closes off the end-side opening of the first housing part.

5. The battery according to claim 2, wherein
the second housing part is designed in a disc shape and the first current collector electrically connects to the second housing part by a weld, and/or
the housing has an electrically insulating seal arranged between the first and second housing parts.

6. The battery according to claim 2, wherein
a second housing part of the housing is designed in a disc shape and has a central breakthrough through which the first current collector is led out of the interior of the housing towards the outside, and/or
the housing has an electrically insulating seal that prevents contact between the first current collector and the second housing part.

7. The battery according to claim 2, wherein
the positive electrode designed in a hollow cylindrical fashion is in direct contact with the first housing part, and/or
the positive electrode is composed of at least two annular individual segments that adjoin one another in a planar fashion via first contact faces and bear on the first housing part via second contact faces.

8. The battery according to claim 1, wherein
the separator is designed as a closed container that completely encloses the negative electrode and merely has a breakthrough for the first current collector, and/or
the separator is connected to the insulator element by welding or bonding.

9. The battery according to claim 8, wherein
the housing comprises a first, beaker-shaped housing part with an end-side housing base, a circumferential housing casing and an end-side opening which lies opposite the housing base, and/or
the housing comprises a second housing part that closes off the end-side opening of the first housing part.

10. The battery according to claim 8, wherein
the second housing part is designed in a disc shape and the first current collector electrically connects to the second housing part by a weld, and/or
the housing has an electrically insulating seal arranged between the first and second housing parts.

11. The battery according to claim 8, wherein
a second housing part of the housing is designed in a disc shape and has a central breakthrough through which the first current collector is led out of the interior of the housing towards the outside, and/or
the housing has an electrically insulating seal that prevents contact between the first current collector and the second housing part.

12. The battery according to claim 8, wherein
the positive electrode designed in a hollow cylindrical fashion is in direct contact with the first housing part, and/or
the positive electrode is composed of at least two annular individual segments that adjoin one another in a planar fashion via first contact faces and bear on the first housing part via second contact faces.

13. The battery according to claim 1, wherein
the housing comprises a first, beaker-shaped housing part with an end-side housing base, a circumferential housing casing and an end-side opening which lies opposite the housing base, and/or
the housing comprises a second housing part that closes off the end-side opening of the first housing part.

14. The battery according to claim 13, wherein
the second housing part is designed in a disc shape and the first current collector electrically connects to the second housing part by welding, and/or
the housing has an electrically insulating seal arranged between the first and second housing parts.

15. The battery according to claim 14, wherein
the positive electrode designed in a hollow cylindrical fashion is in direct contact with the first housing part, and/or
the positive electrode is composed of at least two annular individual segments that adjoin one another in a planar fashion via first contact faces and bear on the first housing part via second contact faces.

16. The battery according to claim 13, wherein
the second housing part is designed in a disc shape and has a central breakthrough through which the first current collector is led out of the interior of the housing towards the outside, and/or
the housing has an electrically insulating seal that prevents contact between the first current collector and the second housing part.

17. The battery according to claim 13, wherein
the second housing part is designed in a disc shape and the first current collector electrically connects to the second housing part by a weld, and/or
the housing has an electrically insulating seal arranged between the first and second housing parts.

18. The battery according to claim 13, wherein
the second housing part is designed in a disc shape and has a central breakthrough through which the first current collector is led out of the interior of the housing towards the outside, and/or
the housing has an electrically insulating seal that prevents contact between the first current collector and the second housing part.

19. The battery according to claim 13, wherein
the positive electrode designed in a hollow cylindrical fashion is in direct contact with the first housing part, and/or
the positive electrode is composed of at least two annular individual segments that adjoin one another in a planar fashion via first contact faces and bear on the first housing part via second contact faces.

20. The battery according to claim 1, wherein
the positive electrode designed in a hollow cylindrical fashion is in direct contact with the first housing part, and/or
the positive electrode is composed of at least two annular individual segments that adjoin one another in a planar fashion via first contact faces and bear on the first housing part via second contact faces.

* * * * *